Patented Apr. 8, 1947

2,418,558

UNITED STATES PATENT OFFICE 2,418,558

SIMULATED GLACÉ FRUIT AND PROCESS OF MAKING SAME

William Schloessinger and Alexander M. Zenzes, New York, N. Y.

No Drawing. Application February 25, 1944, Serial No. 523,910

4 Claims. (Cl. 99—134)

This invention relates to a process of making simulated glacé fruit from the sugar root and in a general way to an improved economical process of making natural or simulated candied or glacé products from fruit or vegetable matter.

Glacé fruit is known as that product of commerce which consists of fruits or fruit substance, including often the peels therefrom, which is rendered non-perishable by a costly and laborious process of impregnation with sugar solutions of successively increasing density. In present practice the impregnation is carried on to a point where the sugar concentration is sufficiently high to prevent spoilage and where the resultant product still retains the desirable characteristics of consistency, texture and taste.

The fruit materials used in the preparation of glacé or candied products is generally limited to fruits or peels of firm consistency and frequently the fruit or peel is stored prior to treatment in solutions of lime and sulphurous acid to bleach or harden the tissues and to preserve them. The known processes are expensive both from the standpoint of manufacture as well as from the standpoint of raw material and the present invention is designed to effect radical economies both as to manufacturing and raw material cost. As to the former, the process of the present invention will reduce the impregnation period of 10 to 30 days to a figure of 30 minutes to 2 hours and as to the cost of raw material, we have found that by utilizing the white vegetable matter of the mature sugar beet and treating it according to our process, a simulated candied or glacé fruit material may be obtained or even a natural candied or glacé vegetable substance may be obtained which is in many respects superior to the product obtained from fruits and which is vastly more economical as far as cost is concerned.

It is an object of the present invention to produce simulated glacé fruit products from sugar beet substance, more particularly from sugar beet root.

Another object is the utilization of the high natural sugar content of sugar beet as a means of producing simulated fruit products or natural candied vegetable products without added sugar.

Another object is an improved method of rapidly absorbing sugars into the sugar beet or into fruit substance by means of dehydrating same partially prior to impregnation.

Another object is the hydrolysis of sucrose within the beet by impregnation with hydrolyzing agents.

Another object is the treatment of whole or segmented sugar beet seed with sugar inverting agents or enzymes in such a way that the mature plant will produce a high amount of natural invert sugars.

Still further objects and advantages will appear from the more detailed description given below. It being understood, however, that the more detailed description is given by way of illustration and explanation only and not by way of limitation, since various changes may be made by those skilled in the art without departing from the scope and spirit of the present invention.

Candied fruit, generally, becomes non-perishable as soon as the sugar concentration of the liquid phase has reached a point where bacterial spoilage is inhibited. The high concentration demanded under these conditions would normally result in crystallization of either sucrose or dextrose unless the ratio of invert sugars to sucrose is adjusted to a point where all three sugars present are in proper relationship regarding their saturation conditions. That ratio for practical purposes, we find is broadly 50:50 for sucrose and invert or 50:25:25 for all three sugars.

Fruits or fruit peels now used in the manufacture of candied and glacé fruit material are either low in total sugars, or, where sugars are present, are low in sucrose. The known processes of impregnating these raw materials with added sugars may take from 10 to 60 days requiring numerous steps of impregnation with successively heavier concentration of syrups. We have found that a simulated candied fruit product of high natural sugar content and not necessarily requiring impregnation with added sugars, may be produced if sugar beet substance, properly treated according to the present invention and co-pending applications, is used as a raw material for such new simulated candied or glacé products. By using the raw material of the present invention the laborious and costly series of successive impregnation steps or complicated continuous impregnation procedures are entirely avoided and the cost of providing added sugars is eliminated.

Suitable sugar beet root having a sugar content of preferably in excess of 15% was peeled and preferably separated from its crown which portions were returned to the sugar factory for further sugar extraction or were processed separately for the extraction of other materials. The remaining portion of the white root was cubed to a size of about $\tfrac{7}{16}$ of an inch square and following this operation the cubes were treated in accordance with the process of co-pending application Number 516,593 to prevent oxidation and blackening. Thereafter the cubes or sliced material was subjected to a treatment further described below, causing about 50% of the sugars to be hydrolized into invert sugars while being present within the beet cell, that is without removing these sugars from the cell for such further treatment.

Simultaneously with or following such conversion of the sugars the water content of the product was sufficiently removed to increase the density of the liquid phase to a safe value as regards bacterial spoilage. We have found that any value in excess of 66 Brix is a safe one though our preferred density is 78° Brix. The process of water removal and inversion may preferably be carried out simultaneously so that the liquid phase has become non-crystallizable by the time the desired density of the liquid phase of 65 to 75° Brix has been reached during dehydration.

The resultant product, obtained by this process has the typical characteristics of true candied fruit. Unlike the dry white stable cossettes or the simulated coconut product described in a co-pending application which is opaque when dry, the product of the present invention, if properly treated, is transparent like true glacé fruit. Furthermore it has a desirable chewing quality due to the naturel strength of the beet fiber which does not require artificial firming operations and which may be varied by special treatment when softer consistency is desired. The product, notwithstanding a high moisture content, will not spoil and may, where desired, be covered with a transparent film of sugar liquor known as glacé coating. Where desired it may be impregnated with colors and flavors to simulate certain fruit types.

The products so obtained are food products of high order, and though not fruit, or substantially not fruit, serve the purpose equally well, or sometimes better. They may be used as cake mix ingredients or as simulated fruit mix ingredients in various types of confectionery work such as bars, fudge and the like.

Furthermore, as will be seen by the more detailed description given below, the time of processing may be reduced to about one half to one hour in which time the desired effect is imparted to the product though not necessarily finished. This economy coupled with lower initial material cost makes it possible to produce the candied products of the present invention on a regular industrial scale, not now possible, and the ensuing advantages to producer and consumer are obvious. In producing the products of the present invention we have established a number of alternative methods some of which are illustrated by one of the following examples.

The first example covers a method to change the sugars within the cell by acid hydrolysis. The second example illustrates the method to change the desired percentage of natural sugars while within the cell by enzyme hydrolysis. The third example applies the sponge principle of instantaneous absorption. Like a sponge after compression reabsorbs more rapidly from his surrounding medium so have we removed from the beet substance, not by compression but preferably by dehydration, 50% or more of the water content in which condition the semi-dehydrated beet substance shows increased absorptive capacity comparable in fact to that of a compressed sponge. It is at that moment that the desired quantity of invert sugar solids is rapidly transferred into the fiber which thereafter is dehydrated to the desired limit.

Example 4 relates to the regular candying procedure as applied to white stable non-oxidizing sugar beet substance.

Example 1.—Acid hydrolysis 1000 grams of fresh beet substance was subjected to the anti-oxidation treatment described in co-pending application Number 516,593. The material which had a total sugar content of 16% was then transferred into a sugar solution having a pH of 1.8 and a density of 20° Brix, and having 95% of sugars as invert sugars. The bath was maintained at a temperature of 75° C. and the material was retained therein for a period of 45 minutes.

Thereafter the material was passed through a solution containing certified food colors and flavors and subsequently it was dehydrated at 160° F. to a moisture content of 20%.

The inversion of the sugars which has taken place during the period of immersion and which continued during the 45 minutes' dehydration period was sufficient to prevent sucrose crystallization in the finished product which had a semi-transparent character, which was flexible and which kept without further precautions indefinitely.

The inverting agent used was hydrochloric acid and it was found that unnecessary or undesirable sugar diffusion could be prevented by immersion in a bath having approximately the same osmotic pressure as the sugar solution within the fresh beet or preferably having a slightly higher density than the beet juice itself. Furthermore, it was found that in the interest of faster penetration of the acid medium, the cubes may be pierced or perforated mechanically where desired.

Example 2.—Enzyme hydrolysis

The highly acid treatment of the previous example was found to be satisfactory for simulated fruit products having a tart flavor. Where such a flavor was not desired, we prefer the alternative method of impregnating the beet substance with a suitable enzyme preparation capable of hydrolizing sucrose under conditions of higher pH. The following is an illustration of the procedure which we found satisfactory;

|  | Parts |
| --- | --- |
| Fresh, cubed beet | 1000 |
| Water of pH 4.5 | 2500 |
| Invert syrup of 80° Brix | 500 |
| Invertase solution of standardized strength | 10 |

The fresh beet material after having received an acid rinse as described in co-pending application above referred to was immersed in the above bath at a temperature between 138 and 148° F. preferably 145° F. and was kept therein for a period of 60 minutes. Thereafter, the impregnated material was, without receiving any rinse, transferred into a dehydrator and dehydrated to a moisture content of 17% within a period of one and one half hours and at a temperature of not more than 160°, insufficient to inactivate the invertase action.

We found that the action of the enzyme continues even after removal from the solution and remains active during dehydration and under certain conditions even thereafter.

The resultant product is free of sucrose crystallization, has a pleasant consistency which in some respects is even superior to that of glacé fruit, is free of undesirable stickiness and keeps indefinitely without spoilage.

An alternative method provides for immersion in cold water at pH 2.5, the quantity of water to beet being adjusted so that the pH may rise automatically to 3.5 to 4 due to the diffusion of salts from the beet which is a desirable improvement as regards the control of inversion. Where desired commercial glucose or other similar non-crystallizable combinations with sucrose may be employed in lieu of invert sugars.

*Example 3.—Sponge principle*

1000 parts of fresh beet substance was given the anti-oxidation treatment above referred to and was subsequently dehydrated to a point where 50% of its moisture content had been removed thereby leaving a liquid phase of sucrose syrup within the beet of a density of approximately 40° Brix. At this point dehydration was interrupted and the material was immersed in an invert syrup having a density of 66° Brix and a temperature of 120° F. The impregnation with invert syrup under these conditions proceeds very rapidly and was interrupted when the weight of the semi-dehydrated beet substance had reached the original fresh weight again. This gain in weight was due to the replacement of the removed moisture by invert sugars.

At this point the material was placed in the dehydrator and was dehydrated to a moisture content of 18% with the result that a candied product was obtained having a non-crystallizable liquid sugar phase of high density and of a composition which was close to the theoretical optimum of 50% total inversion.

No mention is made in this example of flavor and color impregnation which were carried out separately or rather simultaneously with the invert syrup impregnation which is the preferred method.

Several modifications of the foregoing example showed that in excess of 100% of invert sugars may be impregnated into the beet, practically instantaneously, depending upon the density of the invert syrup and the degree of dehydration, that is the degree of what we have called herein the sponge action.

*Example 4.—Conventional procedure applied to sugar beet root*

Fresh, cubed or sliced sugar beet was given the anti-oxidation treatment referred to previously and was then immersed in 50% inverted sugar syrup of 25° Brix, boiled for one minute, kept therein until the sugar density within the beet had reached equilibrium with the invert sugar solution. The density of the syrup was then increased by 10° Brix, keeping the relative proportions of invert to sucrose identical and the process was repeated as before.

This procedure of impregnation, boiling and equalization of syrup of successively increasing density continued until 78° Brix had been reached. The white candied glacé fruitlike product so obtained was of good taste and texture and could be varied further if desired by additional impregnation with colors and flavors.

The processes of the present invention illustrated in the foregoing examples are so rapid in comparison to the methods now in use that no particular necessity exists to speed them up further. However, where additional rapidity is desired, the material may be subjected to a mechanical piercing operation with fine needles for instance thereby increasing the permeability and hastening the penetration of the hydrolyzing agents.

Some sugar beet have a rather pronounced beet odor which may interfere with certain flavors or which may be undesirable where unflavored material is used. While the foregoing examples do not refer specifically to a deodorization step, we find that, where desired, such a deodorization may take place in accordance with the procedure described in the aforementioned co-pending application. Where the process of the present invention is practiced in conjunction with a beet sugar factory, the deodorization step may also conveniently be carried out by subjecting the cubed or sliced or otherwise comminuted beet material to a short boiling step in a sugar solution of preferably equal osmotic pressure. It was found that the specific beet odors have a tendency to pass over into the boiling sugar solution which may be reprocessed in the sugar factory, whereas the deodorized beet substance, after having been rinsed of adhering sugar syrup may receive any of the foregoing treatments in the preparation of simulated candied or glacé fruit products. We have found that deodorization is most effective if the beet substance receives this short boiling treatment in a sugar solution which consists of invert sugars rather than sucrose, the former having much more pronounced flavor transfer capacity than the latter.

Aside from the economies described and the rapidity of operation and other advantages, we have found that the products of the present invention may be produced on a year round basis. This is not possible in the case of ordinary fruits which must be converted into candied or glacé fruit as a seasonal operation. Thus, when utilizing sugar beet substance as a raw material, it is possible to manufacture the white, diced, stable, dehydrated raw material made in accordance with the above-mentioned co-pending application at the time of the so called beet sugar campaign. This material will keep indefinitely and may, during the balance of the year, be reprocessed into candied or glacé fruit according to the present specification.

*Enzyme-coated seed*

Sugar beet produces practically all of its sugars in the form of crystallizable sucrose. In that respect the sugar beet is unique as compared with other vegetables and fruits and this particular property forms the basis for some of the processes of the present invention, particularly those relating to the impregnation of sugar beet substance with agents capable of hydrolizing sucrose.

As an alternative method we have prepared sugar beet seed in such a way that the seed before planting and either with or without segmentation is, covered with an inert medium such as corn starch, for instance, capable of retaining therein pre-determined amounts of invertase. The seed after thus being coated with this enzyme preparation, are planted in the ground in the usual manner and due to the presence of invertase a relatively high amount of sucrose is transformed into invert sugars while the plant is still in the ground.

The foregoing examples are given by way of illustration only and are not intended to limit the scope of the invention thereto, as numerous other applications or modifications of the same principle are evident to those skilled in the art.

For instance, wholly dehydrated stable white beet substance or partly dehydrated beet substance, may be combined with fruits high in natural invert sugars in lieu of the artificial invert sugar bath provided in example number 3, thus producing new types of candied fruit having an equilibrium of natural sugars to result in a non-crystallizable liquid phase of high density.

The new candied fruit composition has preferably less than 20% moisture and the sugar beet root substance and the fruit substance are combined so as to form a homogenous liquid phase containing the sucrose from the beet components and the invert sugars from the fruit components in such relative proportion as to prevent crystallization of the sucrose. Fresh fruit may be used and the desired degree of dryness of the composition be obtained by contacting the fruit intimately with substantially dry sugar beet root substance.

What we claim is:

1. A candied fruit composition having less than 20% moisture, comprising sugar beet root substance and fruit substance combined so as to form a homogenous liquid phase containing the sucrose from the beet components and the invert sugars from the fruit components in such relative proportions as to prevent crystallization of the sucrose.

2. The method of removing moisture from fruit by contacting same intimately with substantially dry sugar beet root substance.

3. As an article of manufacture, sugar beet in comminuted and dried form in which the original sucrose content has been changed into invert sugar while retained within the original cell walls of the sugar beet by the application of a hydrolyzing agent externally of said cell walls.

4. The process of inverting the original sugar content within the original cells of sugar beet by endosmotically introducing a sugar hydrolyzing agent into said cells.

WILLIAM SCHLOESSINGER.
ALEXANDER M. ZENZES.

REFERENCES CITED

The following references are of record in the file of this patent:

UNITED STATES PATENTS

| Number | Name | Date |
|---|---|---|
| 1,273,732 | Bryant | July 23, 1918 |
| 1,309,979 | Booker | July 15, 1919 |
| 1,374,160 | Fowler | Apr. 5, 1921 |
| 1,393,540 | Kelly | Oct. 11, 1921 |
| 1,717,489 | Barlow | June 18, 1929 |
| 1,319,157 | Lingle | Oct. 21, 1919 |
| 2,313,057 | Fischer | Mar. 9, 1943 |